(12) United States Patent
Muller

(10) Patent No.: US 6,739,067 B2
(45) Date of Patent: May 25, 2004

(54) COVER FOR A SEALED LINEAR ENCODER AND A SEALED LINEAR ENCODER

(75) Inventor: Josef Muller, Lakewood, NY (US)

(73) Assignee: Acu-Rite, Inc., Jamestown, NY (US)

(*) Notice: Subject to any disclaimer, the term of this patent is extended or adjusted under 35 U.S.C. 154(b) by 0 days.

(21) Appl. No.: 10/132,071

(22) Filed: Apr. 25, 2002

(65) Prior Publication Data

US 2003/0200671 A1 Oct. 30, 2003

(51) Int. Cl.[7] ............... G01B 21/02; G01B 11/02
(52) U.S. Cl. .................................... 33/703; 33/706
(58) Field of Search .................... 33/703, 705, 706, 33/707, 708, 710, 704

(56) References Cited

U.S. PATENT DOCUMENTS

| | | | |
|---|---|---|---|
| 3,816,003 A | * 6/1974 | Litke | 356/395 |
| 4,250,381 A | * 2/1981 | Yoshiike et al. | 250/237 G |
| 4,586,760 A | 5/1986 | Welker | 312/237 G |
| 5,016,359 A | * 5/1991 | Nagaoka et al. | 33/702 |
| 5,036,597 A | * 8/1991 | Falkinger et al. | 33/706 |
| 5,485,680 A | 1/1996 | Nelle | 33/706 |
| 5,687,489 A | * 11/1997 | Tondorf et al. | 33/706 |
| 6,415,524 B1 | * 7/2002 | Muller et al. | 33/706 |

* cited by examiner

Primary Examiner—Diego Gutierrez
Assistant Examiner—R A Smith
(74) Attorney, Agent, or Firm—Brinks Hofer Gilson & Lione

(57) ABSTRACT

A sealed linear encoder for determining the relative position of a first object and a second object. The sealed linear encoder includes a scale unit arranged in a hollow body that is mounted to a mounting structure associated with the first object and includes a slot which extends in a direction of measurement. A scanning unit for scanning the scale unit and a carrier connected to the second object, wherein the carrier extends through the slot. Sealing lips arranged at the hollow body and abutting the carrier so as to seal the carrier and a cover form-fitted to the hollow body for covering at least the slot.

24 Claims, 3 Drawing Sheets

COVER FOR A SEALED LINEAR ENCODER AND A SEALED LINEAR ENCODER

BACKGROUND OF THE INVENTION

1. Field of the Invention

The present invention relates to a sealed linear encoder for determining the position of two objects relative to one another and a cover for a sealed linear encoder.

2. Discussion of Related Art

Sealed linear encoders of this type include a hollow body connected to one of the two objects. The hollow body contains a scale unit with a scale, and a scanning unit for scanning the scale unit. The scanning unit is connected to a mounting block outside the hollow body via a carrier, and the mounting block is connected to the second object. The carrier extends through a slot in the hollow body from the inside to the mounting block outside of the hollow body. The slot extends in the direction of measurement. When the two objects move relative to one another, the movement of one of the objects is transmitted to the graduation of the scale unit wherein the carrier is moved in the direction of measurement and the movement of the carrier is measured.

In order to protect the highly sensitive graduation of the scale unit and the scanning unit, the slot in the hollow body is closed by sealing lips of plastics or rubber. The sealing lips contact the carrier sealingly on both sides.

When employing such a sealed linear encoder, for example in connection with a machine tool to detect relative movement between the machine tool base and the tool carrier, the sealed linear encoder is exposed to metal chips and cooling liquids ejected from cooling liquid bores at high pressure. This can affect the measurement precision and damage or destroy the sealed linear encoder.

U.S. Pat. No. 5,485,680, the entire contents of which are incorporated herein by reference, describes a sealed linear encoder for determining the relative positions of two objects, wherein the scale unit and the scanning unit are contained in a hollow body having a slot through which a carrier extends for connecting the scanning unit with a mounting block. In the proximity of the carrier, a first seal having V-shaped flexible sealing lips is arranged at the hollow body. A second seal in the outer area of the mounting block between the hollow body and the mounting block shields the space between the hollow body and the mounting block from external influences. The second seal is arranged at both sides of the carrier between the hollow body and the mounting block and includes labyrinthine seals having intertwining webs and slot-like recesses.

In order to protect a sealed linear encoder from dust or spray water, from the risk of damage of the measurement system and the connecting cable by chips or hot metal pieces, from a direct and enduring wetting by cooling or lubricating fluid, as well as intense dust exposure in the area of the linear encoder, it is known to provide an angular sheet metal at the mounting wall of one of the two objects moved relative to the other. The sheet metal extends around the hollow body thereby to shield the area between the slot at the bottom side of the hollow body and the mounting block.

However, the provision of an angular cover formed by a protecting sheet extending around the hollow body is cumbersome since the protecting sheet needs to be screwed to the mounting wall of one of the two objects moved relative to the other, or to be clamped in between a mounting rail for receiving the hollow body and the mounting wall.

U.S. Pat. No. 4,586,760, the entire contents of which are incorporated herein by reference, describes a measuring scale casing and a mounting spar. A drip cover is suspended from the top wall of the casing to cover the casing outside wall and bend over the corner of the casing to also cover the casing front wall over the mounting block of the scanning unit. The drip cover protects the casing and the lip seals from oil, cuttings and dust. The drip cover is retained by the same set screws which secure the casing into the spar or the drip cover is retained on the mounting spar.

SUMMARY OF THE INVENTION

An object of the present invention is to provide a cover for the protection of a sealed linear encoder whose manufacture and mounting is simple. An additional object is to supplement existing sealed linear encoders with a cover without requiring much expense. Furthermore, the cover is to be suitable for different types of connection of the sealed linear encoder to the attachment wall of one of the two objects moved relative to one another.

This object is achieved by a sealed linear encoder for determining the relative position of a first object and a second object. The sealed linear encoder includes a scale unit arranged in a hollow body that is mounted to a mounting structure associated with the first object and includes a slot which extends in a direction of measurement. A scanning unit for scanning the scale unit and a carrier connected to the second object, wherein the carrier extends through the slot. Sealing lips arranged at the hollow body and abutting the carrier so as to seal the carrier and a cover form-fitted to the hollow body for covering at least the slot.

The present invention provides a cover for an effective protection of the sealed linear encoder from dust or spray water, from a danger and damage to the measurement system from chips or hot metal parts, and from an enduring and direct wetting by cooling and lubricating fluid. At the same time, the cover is simple to manufacture and to mount. The cover is suitable for newly installed sealed linear encoders as well as for supplementing existing sealed linear encoders without requiring constructive changes to the objects moved relative to one another or to the sealed linear encoders. Furthermore, the cover according to the present invention is suitable for different ways of attaching the sealed linear encoders to the objects moved relative to one another without requiring time consuming changes to the cover or different types of covers.

Preferably, the sealed linear encoder includes a rectangular hollow body at least one side wall of which engages with the mounting rail connected to the mounting wall of one of the objects, and whose slot extending in the measurement direction is arranged at the bottom side of the hollow body, wherein the carrier extending through the slot connects the scanning unit to the mounting block, and wherein the cover connected to the side wall of the hollow body opposite the attachment wall covers the space between the bottom side of the hollow body and the mounting block.

A preferred embodiment of the cover is L-shaped and connected with the top side and the side wall of the hollow body which is opposite to the mounting wall in a form-locking manner.

For an easy mounting of the cover to the hollow body of the sealed linear encoder, the cover includes leg profiles at the inner sides facing the hollow body, which leg profiles correspond to profiles at the top side and the side wall of the hollow body opposite the mounting wall, so as to provide a compression, plug or snap connection between the cover and the hollow body.

In a first embodiment, the profiles corresponding to one another may include: a web projecting from that leg of the L-shaped cover which abuts the top side of the hollow body, and extending along the longitudinal direction of the hollow body, the web engaging with a groove in the top side of the hollow body which corresponds to the web; and an embracing member arranged at that leg of the L-shaped cover which abuts the side wall of the hollow body, the embracing member engaging with a groove at the bottom end of the side wall and/or at the bottom side of the hollow body or embracing a recess in a form-locking manner.

In an alternative embodiment, the profiles corresponding to one another may include a groove in that leg of the L-shaped cover which abuts the top side of the hollow body, the groove extending in the longitudinal direction of the hollow body, with which groove a web arranged on the top side of the hollow body and corresponding to the groove engages; and an embracing member arranged at that leg of the L-shaped cover which abuts the side wall of the hollow body, the embracing member engaging with a groove at the bottom end of the side wall and/or at the bottom side of the hollow body or embracing a recess in a form-locking manner.

Another advantageous embodiment of the present invention includes an indent arranged in that leg of the L-shaped cover which abuts the top side of the hollow body, the indent facing the top side of the hollow body.

The indent can serve as an additional seal with respect of the mounting wall as well as to adapt the cover to different widths or shapes of the measurement system or the mounting rail connected to the measurement system.

Accordingly, that portion of the leg of the L-shaped cover abutting the top side of the hollow body which extends in between the indent and the mounting wall may be pivotable about the indent, and an end portion thereof may sealingly abut the mounting wall or the mounting rail connected to the mounting wall of one of the two objects, or the indent may form a predetermined breaking point in order to shorten that leg of the L-shaped cover which abuts the top side of the hollow body.

For a snug cover and further sealing, a further leg may project substantially perpendicular from that leg of the L-shaped cover which abuts the top side of the hollow body, the further leg extending away from the top side of the hollow body.

In between the further leg and the mounting wall, an additional sealing element may be provided. In particular, the sealing element may be formed by an adhesive tape.

The cover may include a plastic material and be produced by injection moulding. Alternatively, the cover may be made of aluminum and be produced by extrusion.

Further advantages of the present invention will become clear from the ensuing description of an exemplary embodiment in conjunction with the drawings.

DETAILED DESCRIPTION OF THE PREFERRED EMBODIMENTS OF THE INVENTION

Figure 1:
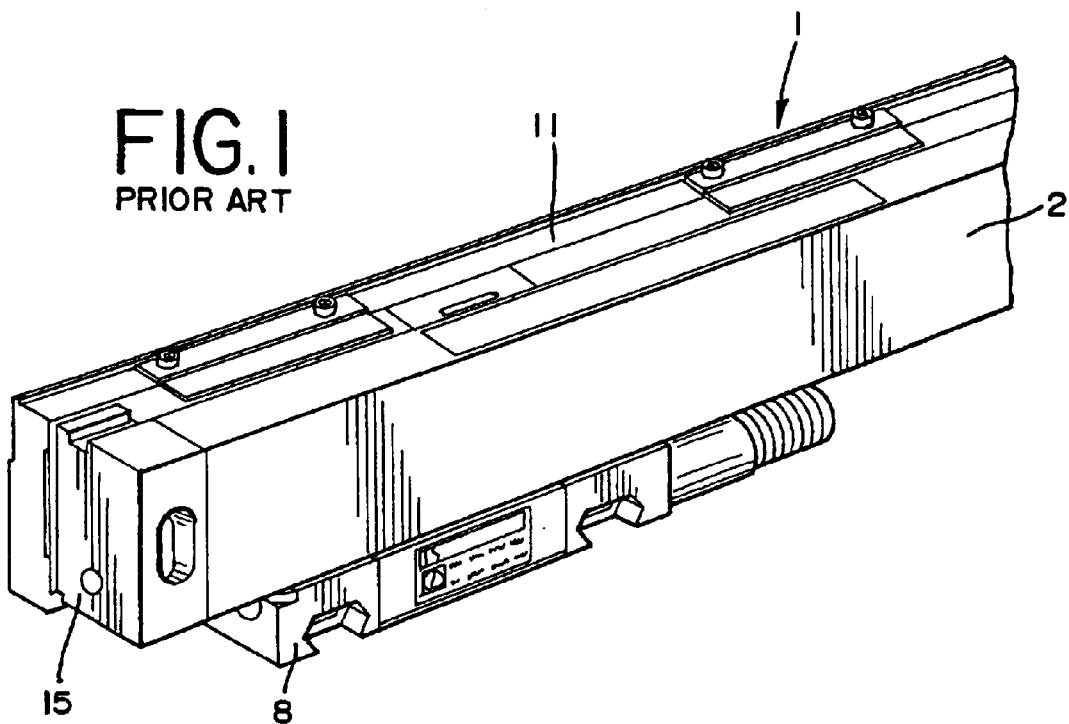
FIG. 1 shows a perspective view of a portion of a known embodiment of a sealed linear encoder attached to a mounting rail.

FIG. 1 illustrates a perspective view of a known-sealed linear encoder 1. The encoder 1 is connected to a mounting rail 11 attached to the mounting wall of one of two objects moved relative to one another, such as a machine-tool base. The sealed linear encoder 1 includes a scale unit arranged within a hollow body 2 whose front ends are formed by end portions 15. At the bottom side of the hollow body 2, a mounting block 8 is arranged which is connected to the other of the two objects moved relative to one another, such as the tool carrier of a machine-tool.

Figure 2:
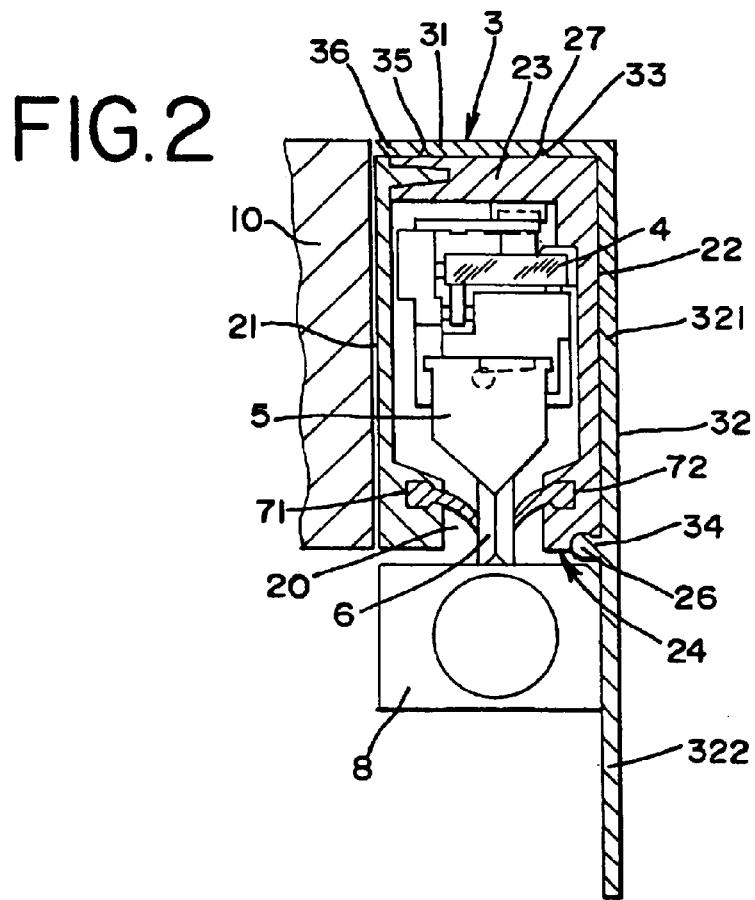
FIG. 2 shows a sectional view through the linear encoder of FIG. 1 with an embodiment of an additional L-shaped cover attached to the linear encoder in accordance with the present invention.

FIG. 2 shows a section through a sealed linear encoder according to FIG. 1. FIG. 2 illustrates that a scale unit 4 is arranged inside the hollow body 2. A scanning trolley forming a scanning unit 5 is guided along the scale unit 4 in a measurement direction for scanning the scale unit 4. The scanning trolley is connected with the mounting block 8 arranged at the bottom side 24 of the hollow body 2 via a carrier 6 extending through a slot 20 at the bottom side 24 of the hollow body 2. In order to protect the scale unit 4 and the scanning unit 5 inside the hollow body 2, sealing lips 71, 72 are provided at the bottom side of the hollow body 2 at both sides of the carrier 6. The sealing lips 71, 72 abut the carrier 6 sealingly and slidably and cover the slot 20.

One of the side walls 21 of the hollow body 2 is connected to and abuts a mounting structure, such as mounting wall 10 or the mounting rail 11 attached to the mounting wall 10 in accordance with FIG. 1, and, via the mounting wall 10, to one of the two objects moved relative to one another, while the mounting block 8 and the carrier 6, via mounting block 8, are attached to the other.

In order to protect the inner space between the sealing lips 71, 72 and the mounting block 8, and in particular the sealing lips 71, 72 and thereby the sealed linear encoder including scale unit 4 and scanning unit 5 arranged inside the hollow body 2, from being damaged by chips, hot metal parts, cooling or lubricating fluid, particularly in case of a high cooling or lubricating fluid consumption in closed machines, as well as from a damage by intense dust exposure, an L-shaped or angular cover 3 is used. The cover 3 is connected to the hollow body 2 in a form-locking manner, whereby its lower portion 322 of the vertical leg 32, whose upper portion abuts the side wall 22 opposite to the mounting wall 10 as well as the top side 23 of the hollow body 2, shields the space between the bottom side 24 of the hollow body 2 and the mounting block 8.

In order to connect the cover 3 to the hollow body 2 in a form-locking manner, the horizontal leg 31 of the cover 3 abutting the top side 23 of the hollow body 2 includes a groove 27 extending in the measurement direction. A saw-toothed shaped web 33 arranged at the top side 23 of the hollow body 2 is inserted into the groove 27. The web 33 corresponds to the groove 27 and also extends in the measurement direction. Further, an embracing member 34 is provided in between the upper portion 321 and the lower portion 322 of the vertical leg 32 of the cover 3. The embracing member 34 engages with a cut 26 at the joint of the side wall 22 and the bottom side 24 of the hollow body 2 and embraces the lower front end of the side wall 22 of the hollow body 2 in a form-locking manner. Note that in an alternative embodiment, the groove 27 and the web 33 can be reversed so that the groove 27 is arranged at the top side 23 of the hollow body 2 and the web 33 is placed on the horizontal leg 31 of the cover 3.

In order to mount the cover 3 to the hollow body 2, the cover 3 is put laterally on the top side 23 and the side wall 22 of the hollow body 22 and is snap-fitted to the hollow body 2 such that the web 33 engages with the groove 27 and the embracing member 34 locks in the cut 26 and embraces the lower end of the side wall 22.

Figure 5:
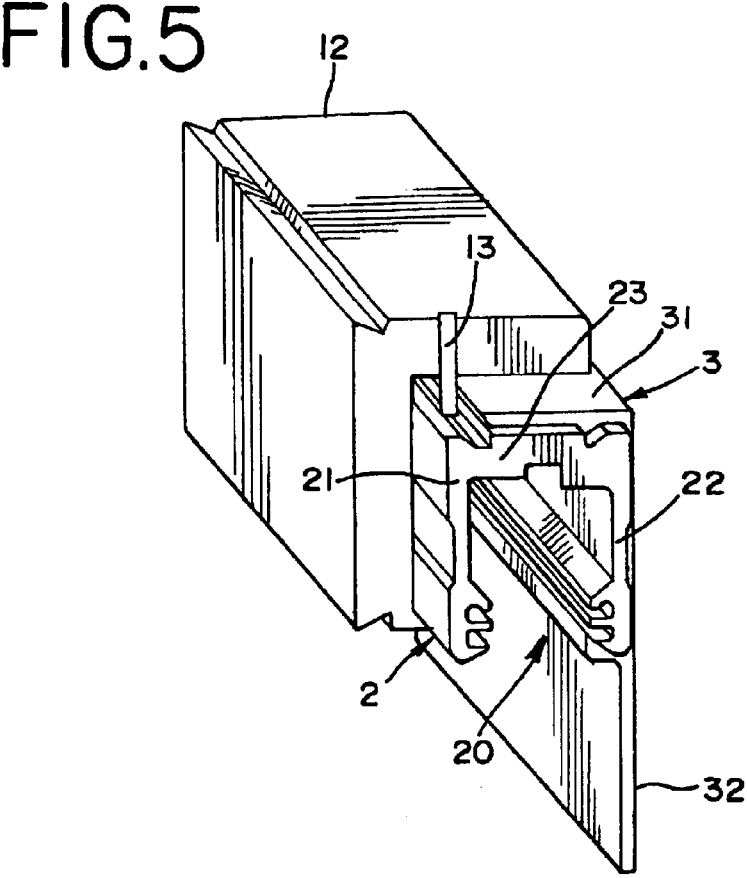
FIG. 5 shows a perspective view of a third embodiment of a cover in accordance with the present invention for a sealed linear encoder of FIG. 1 mounted at two sides.

Alternatively to the form-locking connection between the cover 3 and the hollow body 2 as shown in FIG. 2, the top side 23 of the hollow body can be provided with a web projecting from the top side and extending in the measurement direction. The web engages with a corresponding groove in the horizontal leg 31 of the cover 3. Note that the hollow body 2 of FIG. 2 is designed to be directly attached to wall 10 while the hollow body 2 of FIGS. 1, 3 and 5 are installed by mounting rail 12.

As another alternative to above described form-locking connection, the embracing member 34 of the vertical leg 32 of the cover 3 can engage with a groove at the bottom side 23 of the hollow body 2 extending longitudinally, that is in the measurement direction.

Figure 3:
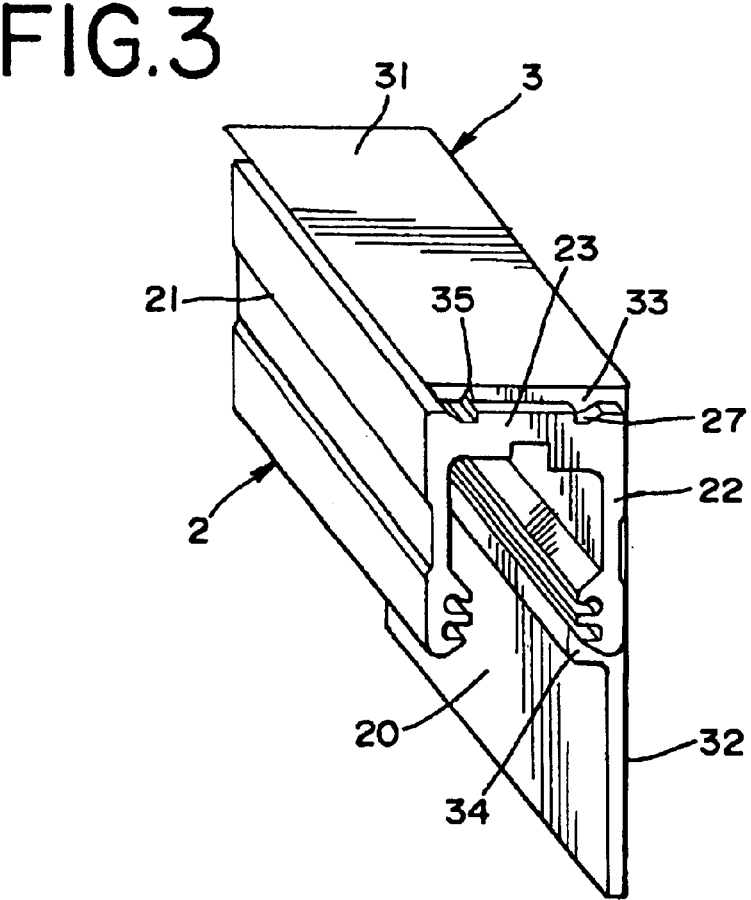
FIG. 3 shows a perspective view of a cover in accordance with the present invention snap-fitted to the hollow body of the sealed linear encoder of FIG. 1.
Figure 4:
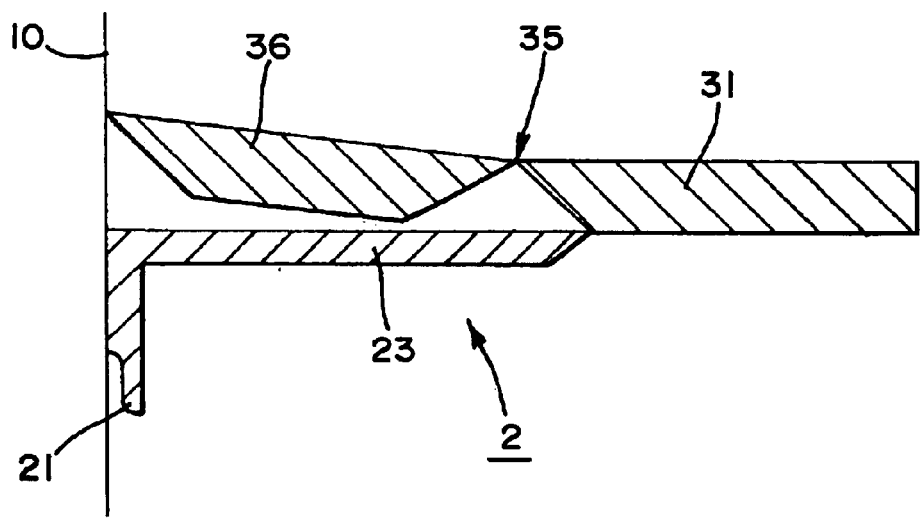
FIG. 4 shows a schematic view of a horizontal leg of the L-shaped cover according to FIG. 3 forming a sealing element.

FIG. 3 illustrates a perspective view of a form-locking connection between the cover 3 and another embodiment of the hollow body 2 after a release of the cover 3 on the top side 23 and the side wall 22 of the hollow body 2. An indent 35 arranged at the inner side of the horizontal leg 31 abutting the top side 23 of the hollow body 2 provides for a sealing of the cover 3 at the mounting wall 10 or the mounting rail. FIG. 4 illustrates a more detailed view of such sealing.

As illustrated in FIG. 4, the outer portion 36 of the leg 31 which extends in between the indent 35 and the end of the horizontal leg 31 abutting the mounting wall 10 or the mounting rail pivots about the indent 35 and thereby abuts the mounting wall 10 or the mounting rail firmly and sealingly. The schematic view of FIG. 4 illustrates clearly how the cover 3 is suited for sealed linear encoders of varying dimensions. This is because the portion 36 pivots about the indent 35 depending on the longitudinal extension of the top side 23 of the hollow body 2, thereby forming a springy seal with varying abutment angles.

Alternatively, the indent 35 forms a preset breaking point such that the outer portion 36 of the horizontal leg 31 can be easily and precisely removed if the type of connection of the sealed linear encoder to the mounting wall 10 of one of the two objects moved relative to one another or the longitudinal extension of the top side 23 of the hollow body 2 so requires.

FIG. 5 illustrates a perspective view of an example of a horizontal leg 31 of the cover 3 shortened at the preset breaking point of the indent 35.

In this embodiment, the hollow body 2 of the sealed linear encoder is attached to an angled mounting rail 12 formed by a vertical and a horizontal portion. The angled mounting rail 12 is screwed to the top side 23 of the hollow body 2 by a plurality of screws 13. In order to prevent a collision of the horizontal leg 31 of the cover 3 and the screws 13, the horizontal leg 31 is shortened at the breaking point of the indent 35 by the outer portion 36 of the horizontal leg 31 of the cover 3. The cover 3 is then inserted in between the horizontal portion of the angled mounting rail 12 and the top side 23 of the hollow body and connected to the hollow body 2 by the snap-fit connection described above.

Figure 6:
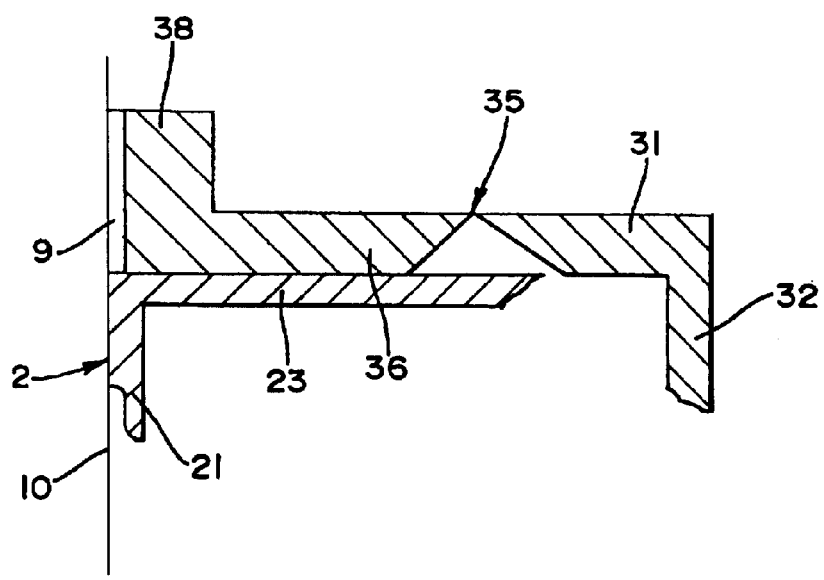
FIG. 6 shows a schematic view of a horizontal leg of an embodiment of an L-shaped cover having a further angled leg.

FIG. 6 shows an enlarged schematic illustration of a section through the upper horizontal part of another embodiment of a cover 3 and the hollow body 2. The cover 3 has a further leg 38 projecting perpendicularly to the outside from the outer portion 36 of the horizontal leg 31 of the cover 3. In order to improve the sealing between the further leg 38 and the mounting wall 10, a sealing element 9 formed by an adhesive tape attached to the mounting wall 10, the mounting rail or the further leg 38, is provided.

Preferably, the covers 3 shown in FIGS. 1–6 are manufactured of stable plastics by injection moulding, or of aluminum by extrusion. This way, any desired length can be manufactured from covers 3 of varying lengths by cutting to length. Thereby, the cover 3 adapted accordingly to the respective sealed linear encoder can be snap-fitted to the hollow body 2 of the sealed linear encoder. This results in an effective shielding of the space between the bottom side of the hollow body 2 and the mounting block 8, thereby protecting the sealed linear encoder from the danger of or damage by chips or hot metal particles, an enduring direct wetting by cooling or lubricating fluid, in particular in case of a high cooling and lubricating fluid consumption in closed machines, and intense dust exposure in the area of the linear encoder.

The function of the cover 3 is a drip cover and it covers the casing front wall over the mounting block of the scanning unit. This drip cover protects the casing and the lip seals from oil, cuttings and dust.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A sealed linear encoder for determining the relative position of a first object and a second object, comprising:
    a scale unit arranged in a hollow body that is mounted to a mounting structure associated with said first object and comprises a slot which extends in a direction of measurement;
    a scanning unit for scanning said scale unit;
    a carrier connected to said second object, wherein said carrier extends through said slot;
    sealing lips arranged at said hollow body and abutting said carrier so as to seal said carrier; and
    a cover form-fitted to said hollow body for covering at least said slot, wherein said cover and said hollow body comprise profiles corresponding to each other, thereby to provide a compression, plug or snap connection between said cover and said hollow body while allowing movement between said cover and said hollow body.

2. The sealed linear encoder of claim 1, wherein said mounting structure comprises a mounting wall of said first object.

3. The sealed linear encoder of claim 2, wherein said hollow body comprises at least one side wall that abuts said mounting wall, and wherein said slot is arranged at a bottom side of said hollow body, and wherein said carrier extends through said slot connecting said scanning unit to a mounting base, and wherein said cover is connected to a side wall of said hollow body opposite to said mounting wall so as to cover a space between said bottom side of said hollow body and said mounting base.

4. The sealed linear encoder of claim 3, wherein said cover is L-shaped and form-fitted to a top side of said hollow body and said side wall of said hollow body opposite to said mounting wall.

5. The sealed linear encoder of claim 1, wherein said mounting structure comprises a mounting rail connected to a mounting wall of said first object.

6. The sealed linear encoder of claim 5, wherein said hollow body comprises at least one side wall that abuts said mounting rail, and wherein said slot is arranged at a bottom side of said hollow body, and wherein said carrier extends through said slot connecting said scanning unit to a mounting base, and wherein said cover is connected to a side wall of said hollow body opposite to said mounting rail so as to cover a space between said bottom side of said hollow body and said mounting base.

7. The sealed linear encoder of claim 1, wherein said cover is L-shaped and form-fitted to a top side of said hollow body and a side wall of said hollow body opposite to said mounting wall.

8. The sealed linear encoder of claim 1, wherein said cover is L-shaped and comprises:
   a first leg comprising an inner side facing said hollow body as well as said top side;
   a second leg comprising a second inner side facing said hollow body as well as said side wall; and
   a further leg projecting substantially perpendicular from said first leg, said further leg extending away from said top side of said hollow body.

9. The sealed linear encoder of claim 1, wherein said cover comprises a plastic and is manufactured by injection moulding.

10. The sealed linear encoder of claim 1, wherein said cover comprises aluminum and is manufactured by extrusion.

11. A sealed linear encoder for determining the relative position of a first object and a second object, comprising:
   a scale unit arranged in a hollow body that is mounted to a mounting structure associated with said first object and comprises a slot which extends in a direction of measurement, wherein said mounting structure comprises a mounting wall of said first object and said hollow body comprises at least one side wall that abuts said mounting wall, and wherein said slot is arranged at a bottom side of said hollow body,
   a scanning unit for scanning said scale unit;
   a carrier connected to said second object, wherein said carrier extends through said slot connecting said scanning unit to a mounting base,
   sealing lips arranged at said hollow body and abutting said carrier so as to seal said carrier; and
   a cover form-fitted to said hollow body for covering at least said slot, wherein said cover is connected to a side wall of said hollow body opposite to said mounting wall so as to cover a space between said bottom side of said hollow body and said mounting base and said cover is L-shaped and form-fitted to a top side of said hollow body and said side wall of said hollow body opposite to said mounting wall and wherein said cover comprises:
      a first leg comprising an inner side facing said hollow body as well as said top side;
      a second leg comprising a second inner side facing said hollow body as well as said side wall; and
   wherein said cover and said hollow body comprise profiles corresponding to each other, thereby to provide a compression, plug or snap connection between said cover and said hollow body.

12. The sealed linear encoder of claim 11, further comprising:
   a web projecting from said first leg so as to abut said top side of said hollow body along a longitudinal axis of said hollow body, said web engaging with a corresponding groove at said top side of said hollow body; and
   an embracing member arranged at said second leg so as to abut said side wall of said hollow body, said embracing member form-fitting to a cut formed in said hollow member.

13. The sealed linear encoder of claim 11, further comprising:
   a web projecting from said first leg so as to abut said top side of said hollow body along a longitudinal axis of said hollow body, said web engaging with a corresponding groove at said top side of said hollow body; and
   an embracing member arranged at said second leg so as to abut said side wall of said hollow body, said embracing member embracing a shoulder formed in said hollow member.

14. The sealed linear encoder of claim 11, further comprising:
   a groove provided in said first leg, said groove abuts said top side of said hollow body and extends along a longitudinal axis of said hollow body;
   a web arranged at said top side of said hollow body so as to engage with said groove; and
   an embracing member arranged at said second leg, said embracing member abuts said side wall of said hollow body and form-fitting to a cut formed in said hollow body.

15. The sealed linear encoder of claim 11, further comprising:
   a groove provided in said first leg, said groove abuts said top side of said hollow body and extends along a longitudinal axis of said hollow body;
   a web arranged at said top side of said hollow body so as to engage with said groove; and
   an embracing member arranged at said second leg, said embracing member abuts said side wall of said hollow body and embracing a shoulder formed in said hollow member.

16. The sealed linear encoder of claim 11, further comprising an indent at said first leg, said indent abuts said top side of said hollow body and said indent faces said top side of said hollow body.

17. The sealed linear encoder of claim 16, wherein a portion of said first leg that abuts said mounting structure extends in between said indent and said mounting structure, said portion is pivotable around said indent, and wherein an end of said portion sealingly abuts said mounting structure.

18. The sealed linear encoder of claim 16, wherein said indent forms a breaking point for shortening said first leg and said breaking point abuts said top side of said hollow body.

19. A sealed linear encoder for determining the relative position of a first object and a second object, comprising:

a scale unit arranged in a hollow body that is mounted to a mounting structure associated with said first object and comprises a slot which extends in a direction of measurement;

a scanning unit for scanning said scale unit;

a carrier connected to said second object, wherein said carrier extends through said slot;

sealing lips arranged at said hollow body and abutting said carrier so as to seal said carrier;

a cover form-fitted to said hollow body for covering at least said slot, wherein said cover is L-shaped and comprises:
- a first leg comprising an inner side facing said hollow body as well as said top side;
- a second leg comprising a second inner side facing said hollow body as-well as said side wall; and
- a further leg projecting substantially perpendicular from said first leg, said further leg extending away from said top side of said hollow body; and
- a sealing element in between said further leg and said mounting structure.

20. The sealed linear encoder of claim 19, wherein said sealing element comprises an adhesive tape.

21. A cover for covering a slot of a linear encoder which extends in a direction of measurement, said cover comprises:

a portion that shields a slot of a linear encoder;

means for snap in or snap up attachment of said cover to a body of a linear encoder while allowing movement between said cover and said body of said linear encoder.

22. The cover of claim 21, wherein said means for snap in or snap up attachment of said cover to said body of said linear encoder comprises a protrusion for engaging a recess of said body.

23. The cover of claim 21, further comprising;

a leg; and an embracing member on said leg for clamping said cover on said body.

24. The cover of claim 23, wherein said embracing member comprises a protrusion for engaging in a recess of said body.

* * * * *

UNITED STATES PATENT AND TRADEMARK OFFICE
CERTIFICATE OF CORRECTION

PATENT NO. : 6,739,067 B2 Page 1 of 1
APPLICATION NO. : 10/132071
DATED : May 25, 2004
INVENTOR(S) : Josef Muller It is certified that error appears in the above-identified patent and that said Letters Patent is hereby corrected as shown below:

Columns 8-9, in claim 19, line 18, after "hollow body" delete "as-well" and substitute --as well-- in its place.

Signed and Sealed this

Twelfth Day of December, 2006

JON W. DUDAS
*Director of the United States Patent and Trademark Office*